Patented Aug. 30, 1949

2,480,517

UNITED STATES PATENT OFFICE 2,480,517

FUSED RIBOFLAVIN-AMIDE

Paul Stecher, New York, N. Y., assignor to Merck & Co., Inc., Rahway, N. J., a corporation of New Jersey No Drawing. Application March 2, 1946, Serial No. 651,671

6 Claims. (Cl. 260—211)

This invention relates to improved compositions which are useful for the administration of vitamins both orally and by injection, and for the enrichment of foodstuffs and for pharmaceutical preparations generally. More particularly, my invention is concerned with a novel and improved riboflavin-containing composition which permits the preparation of stable, physiologically active, aqueous solutions of riboflavin and other isoalloxazines, or derivatives thereof, of much higher concentration than heretofore practicable.

The vitamin material, pure riboflavin, is only very sparingly soluble in water at 20° C. or in acidic aqueous solutions. For example, it will dissolve in water at 20° C. only to the extent of 0.12 milligram of riboflavin per milliliter of solution. While riboflavin is more soluble in alkaline aqueous solutions, alkaline solutions are very unstable, the riboflavin initially present therein rapidly losing its physiological activity.

In view of these peculiar solubility characteristics of riboflavin it has not been previously possible to prepare riboflavin solutions of concentrations as great as desired. In those instances where a liquid enriching medium is employed for the vitamin enrichment of foods, pharmaceutical preparations, feedstuffs or similar products, it has been possible to incorporate riboflavin therein only to the extent of its very limited solubility in water or other solvents. There has existed, however, a distinct need for stable, physiologically active solutions having a higher content of dissolved riboflavin, both for the enrichment of products normally lacking in sufficient quantities of riboflavin, and for injection in the parenteral administration of vitamin preparations.

In previous attempts to improve the solubility of riboflavin in aqueous solutions various substances of generally very divergent natures have been added to aqueous riboflavin-containing solutions. Among such agents tending to improve solubility, nicotinic acid, either in the form of its salts, or its N-non-substituted amide, has been used to some extent. Other such substances suggested for use include boric acid and its salts. Complexes of urea, or its salts, or certain water-soluble alcohols, or phenol or polyphenol-sulfonic acid salts, will also increase the solubility of riboflavin in aqueous solutions to a slight extent (seldom, however, as much as 5 milligrams per milliliter of solution). However, none of these attempts to obtain solutions of riboflavin of aqueous or acidic character containing large amounts of dissolved riboflavin has been satisfactory. In general, the solubilizing agent has to be present in enormous amounts in order to secure any effect at all, and the solubility of the riboflavin in aqueous and acidic solutions is increased thereby only to a disproportionate and relatively small amount.

It is, accordingly, the primary object of this invention to prepare stable, physiologically active solutions containing riboflavin in aqueous media wherein the riboflavin concentration is high enough to permit the use of this solution for the enrichment of food products, and for the administration of vitamins both orally and parenterally. It is another object of this invention to prepare riboflavin-containing compositions which are soluble, both in neutral and acidic aqueous solutions, to a degree never previously attainable. These and still further objects of my invention will be apparent from the ensuing disclosure of certain preferred embodiments thereof.

The advantages of improved solubility, to a degree never previously attainable, both in neutral and acidic aqueous solutions, are secured by fusing the riboflavin with an amide, thereby producing a new composition or compound which is highly soluble in both neutral and acidic solutions. For example, the riboflavin may be fused with an amide such as urea, urethane, acetamide or nicotinamide (niacin amide). While the exact mechanism by which the riboflavin is rendered much more soluble, both in neutral and acidic aqueous solutions, is not fully known to me, and I do not wish to be bound or held to any theory of operation, it is my belief that the riboflavin and amide when fused together form a new chemical compound which dissolves, to a much greater degree than riboflavin alone, in aqueous solutions of the character specified. When dissolved in water or other aqueous medium, however, the resulting solution contains a physiologically active form of riboflavin and may be used as a source of this vitamin material.

Since it is an advantage to have an acidic salt present in the prepared solution, the acidic salt serving to maintain the pH of the aqueous solution of the fused product near the iso-electric point of riboflavin, thereby yielding a highly concentrated and very stable solution having riboflavin activity, I ordinarily incorporate an acidic salt with the fused product. Among suitable acidic salts, I have secured very satisfactory results with monosodium phosphate (NaH$_2$PO$_4$.H$_2$O)

or with thiamin hydrochloride. It is generally advantageous, although not essential, to mix the acidic salt with the riboflavin and amide prior to fusion, since the riboflavin and amide will react to form the fused product whether or not the acidic salt is present. When the fused product prepared in this manner is dissolved in water the acidic salt is already incorporated with the fused product, and it is not necessary to add it separately thereto. However, if desired, the riboflavin and amide, such as urea, urethane, acetamide or nicotinamide, may be fused together to produce the new composition or new chemical compound of highly improved solubility characteristics, and the acidic salt may be added thereto when the composition or compound is dissolved in an aqueous medium and the solution prepared.

The proportions in which the riboflavin and amide may be fused together to form the new product may be varied within considerable limits. It is my belief, although I have not been able to establish it fully in all cases, that the amide, such as urea, urethane, acetamide or nicotinamide, reacts with the riboflavin in equimolar amounts to form the new fused composition or compound capable of yielding an aqueous solution, either neutral or acidic in character, containing riboflavin dissolved therein in a much higher degree than ever previously attainable. Accordingly it is preferred that the amide and riboflavin, which are fused together to form my new preparation, be present in equimolar proportions. This is not essential, of course, since one or the other may be present in excess, although the excess amount over that corresponding to equimolar proportions, may not react, and may perhaps, remain in the fused composition in the unreacted condition.

The amount of acidic salt which may be incorporated either prior to fusion, or subsequent to preparation of the new compositions by fusion, may generally be very small. I have secured satisfactory results with amounts as low as 10% by weight of the fused mixture. On the other hand, there is no particular objection to have the acidic salt present in greater amounts, and it may, in fact, be present in any desirable or necessary ratio to maintain the iso-electric point of the solution prepared by dissolving the fused product in water, below the iso-electric point of riboflavin, i. e. below a pH of 6.3.

While, as previously stated, it is my belief that the riboflavin and amide react to form a new chemical compound, I have not been able to substantiate this by chemical evidence in all cases. However, when riboflavin is fused with nicotinamide, the iso-piestic phase diagram clearly shows the existence of a new chemical compound, the riboflavin and niacinamide being fused together in equimolar proportions. All of the physiological activity of riboflavin is retained in the fused products and their solutions.

In this way I am able to prepare physiologically active solutions containing as high as 6% of dissolved riboflavin (60 milligrams per milliliter of solution) at neutral pH values. Physiological tests of the solubilized riboflavin solutions indicate that such solutions are entirely satisfactory as sources of riboflavin, and possess all the physiologically desirable properties of solutions of this vitamin.

As examples of my improved riboflavin-containing compositions having a high degree of solubility in water at neutral and acidic pH values, the following are given:

*Example 1*

2.5 grams of riboflavin, 22.5 grams of urea, and 5.0 grams of monosodium phosphate ($NaH_2PO_4.H_2O$) were intimately mixed after being reduced to a fine powder. The mixture was then heated in an oil bath to a temperature of 140° C., and the contents thoroughly stirred until the melt had changed to a clear red liquid. Melting to this stage required approximately 5 minutes.

The fused material was then poured into a mortar and allowed to cool to room temperature. The solidified product was ground fine enough to pass through a 200 mesh sieve. The resulting product was highly soluble in aqueous solutions, both at neutral and acid pH values. It was found that the fused product contained 84.1 milligrams of riboflavin per gram, as ascertained by biological assay.

A solution of 1% concentration of the fused product was found to have a pH very close to 6.3 (the iso-electric point of riboflavin). It was found that the fused product readily dissolved to give a solution having a concentration as high as 6% riboflavin. It is evident that the product is much more soluble under these conditions than riboflavin, and can be readily utilized to give solutions of riboflavin of concentrations never previously attainable under acid or neutral conditions.

*Example 2*

15 grams of niacinamide and 5 grams of riboflavin were mixed intimately and fused in an oil bath at a temperature of 140° C. After melting to a homogeneous condition the fused melt was allowed to cool to room temperature, and then powdered to secure a finely divided product.

The powdered product was dissolved in an aqueous solution having a volume of 1 liter, this aqueous solution containing 10 grams of thiamin hydrochloride and 100 milligrams of pyridoxine hydrochloride. The resulting multivitamin solution was then placed in ampuls and sterilized in an autoclave for 30 minutes at 125° C. The pH of the multivitamin solution, which was capable of being used for injection purposes, was 4.9. No solubilizing agent, other than vitamin material, was present in the resulting multivitamin solution.

*Example 3*

1 mole of acetamide was heated on the steam bath to a temperatre of 70° C. 1 mole of riboflavin was then added thereto and the mixture stirred until a clear melt was formed. This required about 5 minutes. The melt was then cooled and pulverized to a fine powdery product. It was dissolved in an aqueous solution to yield a concentration of 2.5 grams of riboflavin per 100 milliliters of solution. No acidic salt was present in this preparation.

*Example 4*

1 mole of urethane was heated on the steam bath to a temperature of 63° C. 1 mole of riboflavin was then added thereto and the mixture stirred until a clear melt formed. This required about 5 minutes. The melt was then allowed to cool to room temperature and pulverized to give a finely divided product. This product could be readily dissolved in a neutral aqueous solution to yield a solution containing 2 grams of riboflavin per 100 milliliters of solution. No acidic salt was present in this preparation.

Various changes and modifications may be

I claim:

1. The method of preparing a more soluble form of riboflavin which comprises fusing riboflavin and an amide selected from the group which consists of urea, urethane, acetamide, and nicotinamide, and allowing the fused product to solidify.

2. A solubilized form of riboflavin comprising a fused mixture of riboflavin and an amide selected from the group which consists of urea, urethane, acetamide, and nicotinamide.

3. A solubilized form of riboflavin comprising the fusion product of riboflavin and a substantially equimolar amount of an amide selected from the group which consists of urea, urethane, acetamide, and nicotinamide.

4. The fused reaction mixture of riboflavin and a substantially equimolar amount of nicotinamide.

5. The fused reaction mixture of riboflavin and a substantially equimolar amount of acetamide.

6. The fused reaction mixture of riboflavin and a substantially equimolar amount of urethane.

PAUL STECHER.

REFERENCES CITED

The following references are of record in the file of this patent:

UNITED STATES PATENTS

| Number | Name | Date |
| --- | --- | --- |
| 2,027,905 | Goth | Jan. 14, 1936 |
| 2,256,604 | Auhagen | Sept. 23, 1941 |
| 2,407,412 | Frost | Sept. 10, 1946 |

OTHER REFERENCES

Science, Supplement, November 24, 1933, volume 78, page 6.